Figure 1:
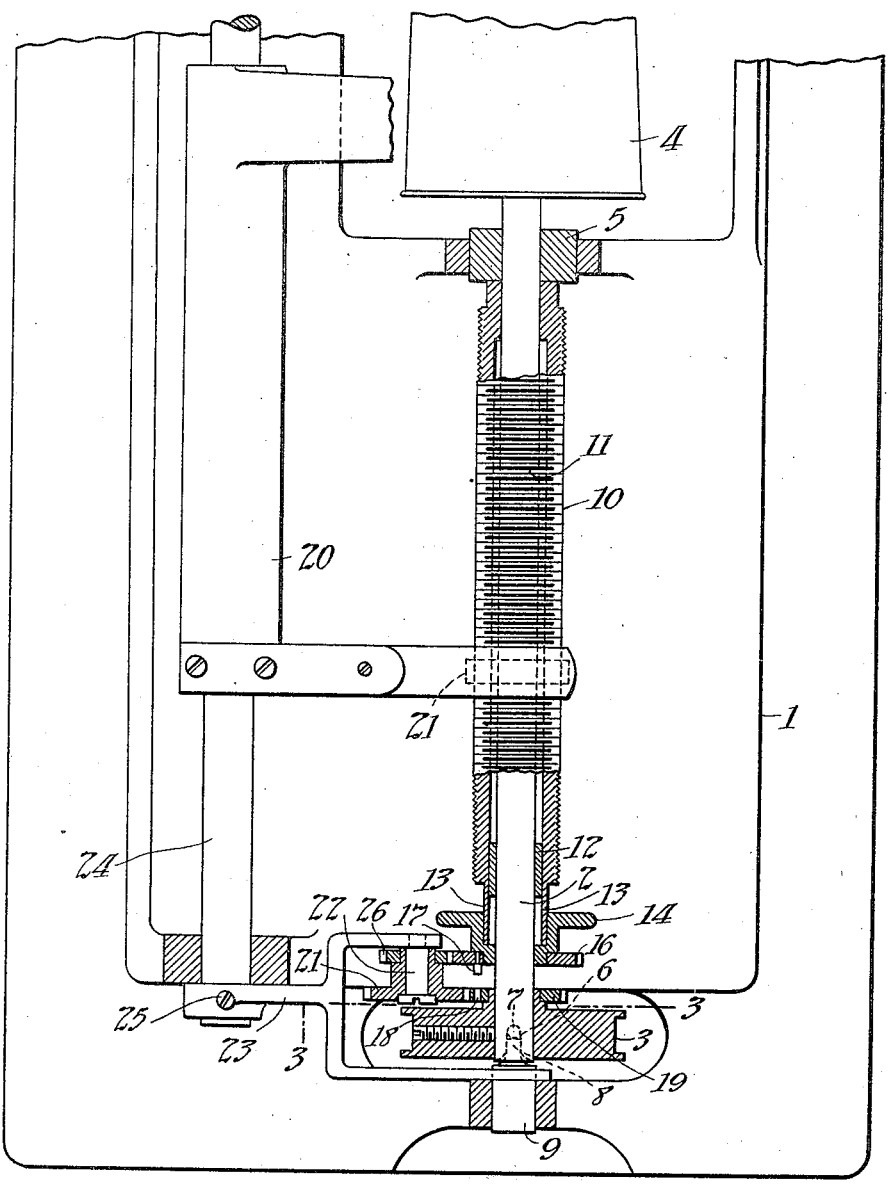

P. WEBER.
PHONOGRAPH.
APPLICATION FILED APR. 8, 1908.

942,475.

Patented Dec. 7, 1909.
2 SHEETS—SHEET 1.

P. WEBER.
PHONOGRAPH.
APPLICATION FILED APR. 8, 1908.
942,475.
Patented Dec. 7, 1909.
2 SHEETS—SHEET 2.
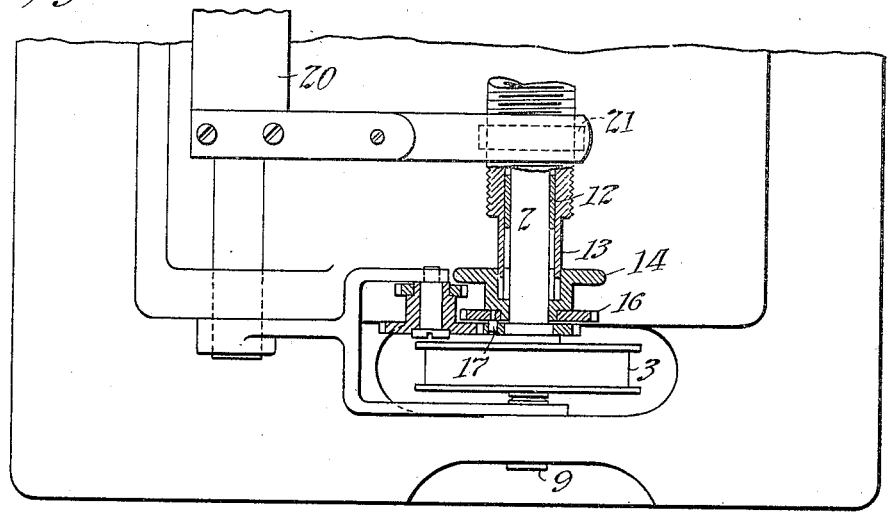
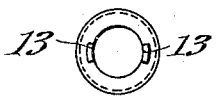
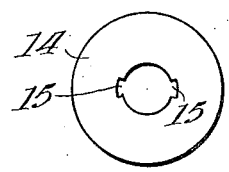
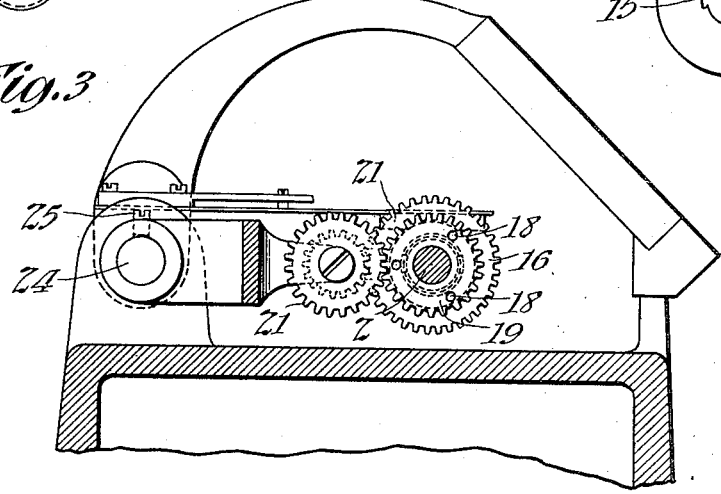
Witnesses:
Frank D. Lewis
J. M. Caufield
Inventor:
Peter Weber
by Frank L. Dyer
Atty.

UNITED STATES PATENT OFFICE.

PETER WEBER, OF ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

942,475.   Specification of Letters Patent.   Patented Dec. 7, 1909.

Application filed April 8, 1908. Serial No. 425,844.

*To all whom it may concern:*

Be it known that I, PETER WEBER, a citizen of the United States, residing at Orange, in the county of Essex and State of New Jersey, have invented certain new and useful Improvements in Phonographs, of which the following is a description.

My invention relates to phonographs and has for its object the provision of interchangeable means for feeding the traveling carriage upon which the sound box is mounted at either of two rates of speed, one of which may be suitable for operating upon a record of one hundred threads per inch, and the other for operating upon a record having 200 threads per inch. The particular means employed by me comprises a hollow rotary feed screw mounted concentrically with respect to an inner shaft, and capable of being locked to said shaft so as to rotate therewith, or of being unlocked therefrom and driven through interposed gearing so as to rotate at a different rate of speed.

In order that my invention may be more fully understood, reference is hereby made to the accompanying drawing, forming part of this specification, and in which—

Figure 1 is a plan view partly in section, of a phonograph constructed in accordance with my invention, the parts being arranged for feeding the sound box carriage at a suitable speed for operating upon records having two hundred threads per inch; Fig. 2 is a similar view, showing the parts arranged for feeding the carriage at a suitable speed for operating upon records having one hundred threads per inch; Fig. 3 is a section on line 3—3 of Fig. 1; Fig. 4 is an end view of the feed screw shaft; and Fig. 5, is a face view of the sleeve which engages the end of the said shaft.

In these views corresponding parts are represented by the same numerals of reference.

The phonograph shown is of a well-known type, and comprises a base or body 1, upon which is rotatably mounted the main shaft 2, which carries at one end, the drive pulley 3, and at the opposite end the mandrel 4, for supporting the sound record. This shaft may be supported in any suitable manner, but I have shown the same journaled in a bearing 5 intermediate its ends, and the end upon which the pulley is mounted is cupped, as shown at 6, to receive a spherical roller or ball 7, and a stud or center 8 formed on the pin 9, which is secured to the body 1. Upon the shaft 2 is rotatably mounted a hollow shaft 10, formed with a feed screw 11 of fine pitch, preferably one hundred threads to the inch, said screw shaft being journaled at its inner end directly upon the shaft 2, as shown, and its outer end upon a bearing sleeve 12, interposed between the two shafts. The outer end of the screw shaft 10 is cut away to form a pair of oppositely disposed tongues 13, and upon the shaft 2 is slidably mounted a sleeve 14, having a pair of notches 15, which receive the tongues 13, of the shaft 10, thereby keying said members together. Upon the sleeve 14 is fixed a spur gear 16, which is provided with one or more pins 17 projecting from its face and adapted to engage holes or openings 18, formed in the spur gear 19, which is fixed upon the hub of the drive pulley 3. When in this position, as illustrated in Fig. 2, the gears 16 and 19 are locked together and the screw shaft 10 is therefore locked to the drive pulley 3 and shaft 2, and rotates at the same speed, and therefore feeds the sound box carriage 20 by reason of the engagement of the feed nut 21 with the screw 11 at a rate suitable for operating upon records having one hundred threads per inch.

Meshing with the gear 19, is a spur gear 21, which is journaled on a pin or stud 22, carried by a frame 23. This frame is sleeved at its rear upon the back rod 24, and secured by the set screw 25; the forward end of said frame is supported by the pin 9.

Upon the hub of the gear 21 is fixed a spur gear 26, which is adapted to mesh with the gear 16, when the latter is in the position shown in Fig. 1. When the parts are in these positions, the hollow shaft 10 rotates upon the shaft 2, and is driven from the pulley 3 through the gear train 19, 21, 26 and 16, which gears are so proportioned as to drive the shaft 10 at half the speed of the shaft 2, and thereby feed the carriage 20 at a rate suitable for operating upon records having two hundred threads per inch. In order therefore, to render the instrument capable of operating upon records having one hundred threads per inch, it is necessary only to move the sleeve 14 into such a position as to lock the gear 16 to the gear 19 by the engagement of the pins 17 with the openings 18, as shown in Fig. 2, and in order to adapt the instrument to operate upon records having two hundred threads per inch, it is necessary only to move the sleeve 14 from the position of Fig. 2 into that of Fig. 1.

Having now described my invention, what I claim is:

1. In a phonograph, the combination with the rotating hollow feed screw shaft, of a rotary power shaft within said screw shaft, means for locking said shafts together so as to rotate at the same speed and interchangeable means for gearing said shafts together so as to rotate at different speeds, substantially as set forth.

2. In a phonograph, the combination with the rotary hollow feed screw shaft, the traveling carriage and means co-acting with the feed screw for progressing the same, of a sound record support, a main shaft adapted to rotate said support and situated within the feed screw shaft, means for driving said main shaft, and interchangeable means for driving said feed screw shaft from said main support at different speeds, substantially as set forth.

3. In a phonograph, the combination of the main shaft adapted to rotate the sound record support, a rotary hollow feed screw shaft surrounding said main shaft, a slidable sleeve rotatable with said screw shaft, a partial gear train coupling and gear means carried by said sleeve, said sleeve being adapted thereby to interchangeably couple said shafts together directly and through said gear train, whereby one shaft may be driven from the other at different rates of speed, substantially as set forth.

4. In a phonograph, the combination of a main shaft adapted to rotate the sound record support, a rotary hollow feed screw shaft surrounding said main shaft and adapted to impart a progressive movement to the sound box carriage, and means for gearing said screw shaft to said main shaft, substantially as set forth.

5. In a phonograph, the combination of a rotary main shaft, a rotary hollow screw shaft surrounding the same, and a gear train between said shafts adapted to drive the hollow shaft at one-half the speed of the main shaft, substantially as set forth.

6. In a phonograph, the combination of the main shaft adapted to rotate the sound record support, a rotary hollow feed screw shaft surrounding said main shaft, a drive pulley secured to said main shaft, a splined sleeve slidable upon said screw shaft, and means for coupling said sleeve and pulley together, substantially as set forth.

7. In a phonograph, the combination of the main shaft adapted to rotate the sound record support, a rotary hollow feed screw shaft surrounding said main shaft, a drive pulley secured to said main shaft, a gear secured to said pulley, a splined sleeve slidable upon said screw shaft, a gear secured to said sleeve and facing said first named gear, and coupling means and gear means for coupling said gears together directly or indirectly according to the position of said sleeve, substantially as set forth.

8. In a phonograph, the combination of the shaft 2, hollow shaft 10 surrounding the same, sliding gear 16 rotatable with said hollow shaft, gear 19 rotatable with said shaft 2, gears 21 and 26, and means for locking said sliding gear to the shaft 2 when out of mesh with the gear 26, substantially as set forth.

9. An attachment for phonographs, comprising a removable frame 23 adapted to be secured to the back rod of the phonograph, and a pair of gears 21 and 26 rotatable upon said frame, substantially as set forth.

10. In a phonograph, the combination of a main shaft adapted to rotate the sound record support, a bearing for the same, and a member longitudinally in line with the end of said shaft, said shaft and member being formed, one with a socket and the other with a stud entering the same, and a roller between the end of said stud and the bottom of said socket, substantially as set forth.

This specification signed and witnessed this 6th day of April, 1908.

PETER WEBER.

Witnesses:
FRANK D. LEWIS,
H. H. DYKE.